United States Patent
Rago et al.

(10) Patent No.: US 11,593,857 B1
(45) Date of Patent: Feb. 28, 2023

(54) SYSTEMS AND METHODS FOR IMPROVING A SHOPPING EXPERIENCE WITHIN A RETAIL STORE

(71) Applicant: WALGREEN CO., Deerfield, IL (US)

(72) Inventors: Joseph M. Rago, Hinsdale, IL (US); Nicholas L. Eby, Downers Grove, IL (US)

(73) Assignee: WALGREEN CO., Deerfield, IL (US)

( * ) Notice: Subject to any disclaimer, the term of this patent is extended or adjusted under 35 U.S.C. 154(b) by 566 days.

(21) Appl. No.: 14/930,380

(22) Filed: Nov. 2, 2015

(51) Int. Cl.
*G06Q 30/00* (2012.01)
*G06Q 30/0601* (2023.01)
*G06Q 30/0207* (2023.01)

(52) U.S. Cl.
CPC ..... *G06Q 30/0625* (2013.01); *G06Q 30/0223* (2013.01); *G06Q 30/0224* (2013.01); *G06Q 30/0639* (2013.01)

(58) Field of Classification Search
None
See application file for complete search history.

(56) References Cited

U.S. PATENT DOCUMENTS

| | | | | |
|---|---|---|---|---|
| 6,587,835 | B1 * | 7/2003 | Treyz | G06Q 20/12 |
| | | | | 705/14.64 |
| 9,460,113 | B2 * | 10/2016 | Kim | G06F 16/29 |
| 10,438,214 | B1 * | 10/2019 | Kim | G06Q 30/02 |
| 10,586,251 | B2 * | 3/2020 | Fernandez | G06Q 30/0267 |
| 2001/0023407 | A1 * | 9/2001 | Liyanearachchi | |
| | | | | G06Q 30/0224 |
| | | | | 705/14.25 |
| 2003/0105667 | A1 * | 6/2003 | Millikan | G06Q 30/0261 |
| | | | | 705/14.58 |
| 2005/0033639 | A1 * | 2/2005 | Myers | G06Q 30/02 |
| | | | | 705/14.34 |
| 2008/0027810 | A1 * | 1/2008 | Lerner | G06Q 30/02 |
| | | | | 705/14.39 |
| 2008/0097844 | A1 * | 4/2008 | Hsu | G06Q 20/227 |
| | | | | 705/14.3 |

(Continued)

FOREIGN PATENT DOCUMENTS

| | | | | |
|---|---|---|---|---|
| CA | 2849882 A1 * | 2/2013 | | G06F 16/9554 |
| WO | WO-2009007410 A2 * | 1/2009 | | G06Q 10/0631 |

OTHER PUBLICATIONS

Ertekin, Scott, and Lou E. Pelton. "Navigating the Retail Environment: An Exploratory Investigation of In-Store Mapping Applications." Academy of Marketing Studies Journal 19.2 (2015): 37. (Year: 2015).*

(Continued)

*Primary Examiner* — Michael Bekerman
(74) *Attorney, Agent, or Firm* — Marshall, Gerstein & Borun LLP; Randall G. Rueth

(57) ABSTRACT

Embodiments are provided for enhancing an in-store retail experience for a customer by facilitating search queries for products and services available for sale in a retail store. According to certain aspects, an electronic device may receive a search string associated with the retail store and transmit the search string to a server that may execute a corresponding search query. The server may send results from the search query to the electronic device, which may dynamically update an interface accessible by a user. The user may view the information and make appropriate selections.

14 Claims, 9 Drawing Sheets

(56) References Cited

U.S. PATENT DOCUMENTS

| | | | | |
|---|---|---|---|---|
| 2009/0012704 A1* | 1/2009 | Franco | .................. | G01C 21/20 |
| | | | | 701/532 |
| 2011/0238476 A1* | 9/2011 | Carr | ...................... | G06Q 30/00 |
| | | | | 705/14.25 |
| 2013/0297422 A1* | 11/2013 | Hunter | ............... | G06Q 30/0261 |
| | | | | 705/14.58 |
| 2014/0207552 A1* | 7/2014 | Blosser | ............. | G06Q 30/0239 |
| | | | | 705/14.26 |
| 2014/0351078 A1* | 11/2014 | Kaplan | ............. | G06Q 30/0631 |
| | | | | 705/26.7 |
| 2015/0079942 A1* | 3/2015 | Kostka | ............... | G06Q 30/0267 |
| | | | | 455/411 |
| 2017/0255957 A1* | 9/2017 | Mehta | .................. | G06Q 20/387 |

OTHER PUBLICATIONS

Bardaki, Cleopatra, Panos Kourouthanassis, and Katerina Pramatari. "Exploring the deployment and adoption of RFID-enabled retail promotions management." International Journal of RF Technologies 2.2 (2010): 91-115. (Year: 2010).*

* cited by examiner

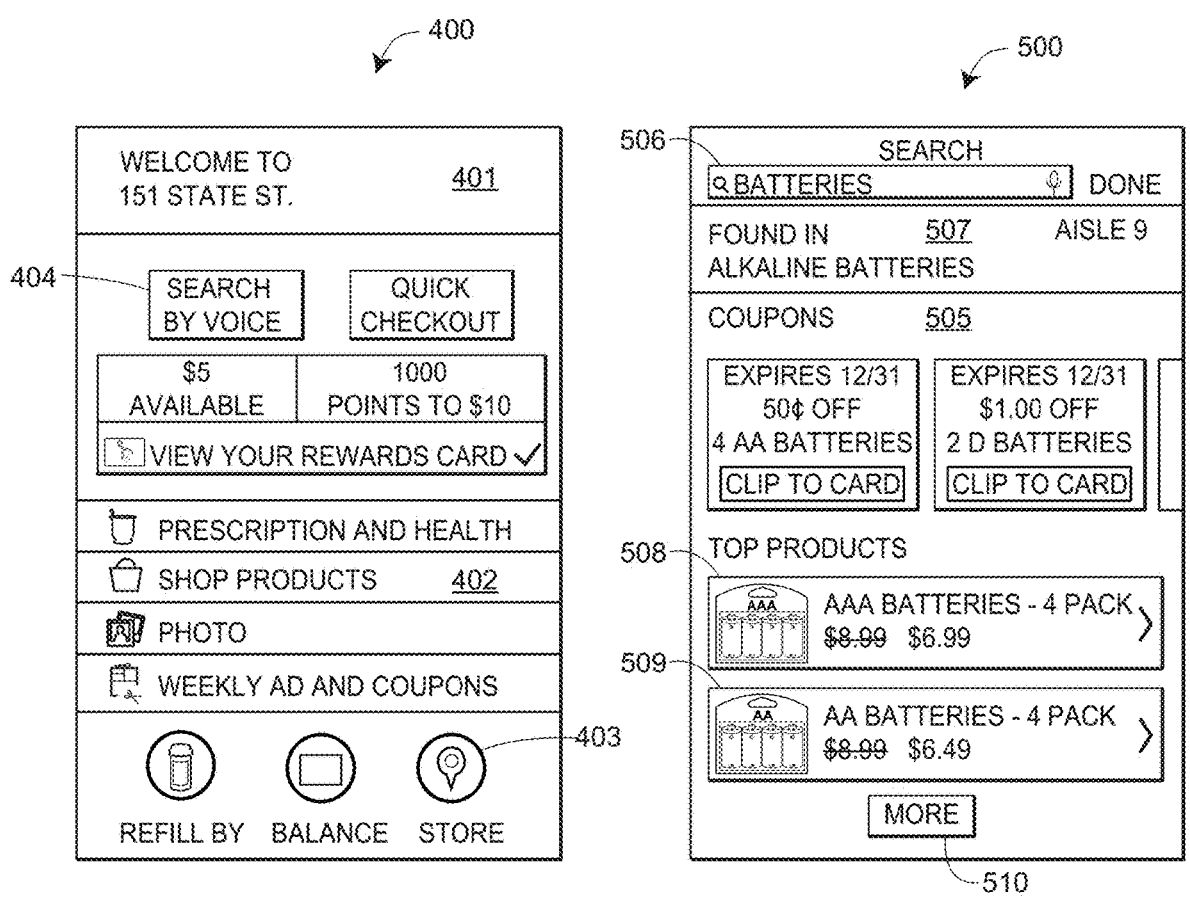

SYSTEMS AND METHODS FOR IMPROVING A SHOPPING EXPERIENCE WITHIN A RETAIL STORE

FIELD

This application generally relates to enhancing an in-store retail experience for a customer. In particular, this application relates to dynamically determining information relevant to products available for sale within a retail store.

BACKGROUND

Portable electronic devices such as smart phones and tablet devices are becoming more ubiquitous as underlying technology and device capability improves. These devices incorporate numerous components that support various device functions and applications. For example, current smart phones include components that enable network connections as well as location modules capable of detecting device location.

Certain technologies exist to assist individuals during a retail shopping experience. For example, individuals may maintain account information using device applications, and complete point of sale transactions using device hardware (e.g., near field communication technology). However, existing technologies do not support certain situations that would improve the shopping experience for these individuals.

There is therefore an opportunity to offer an improved and enhanced shopping experience for individuals within a retail store. In particular, there is an opportunity to enable effective and efficient product location, comparison shopping, and other beneficial functionalities.

SUMMARY

In one embodiment, a computer-implemented method in an electronic device of improving a shopping experience within a retail store is provided. The method may include initiating, by a processor, an application associated with the retail store on the electronic device; receiving a search term from a user of the electronic device; and facilitating a search query using the search term to identify (i) at least one product available for sale within the retail store, and (ii) information associated with an availability of the at least one product within the retail store. The method may further include displaying, in an interface associated with the electronic device, (i) an indication of the at least one product, and (ii) at least a portion of the information associated with the availability of the at least one product within the retail store.

In another embodiment, an electronic device may be provided. The electronic device may include a transceiver configured to connect to a server associated with a retail store; a user interface configured to display content; a memory storing an application associated with the retail store; and a processor interfacing with the transceiver, the user interface, and the memory. The processor may be configured to initiate the application associated with the retail store, receive a search term from a user of the electronic device, facilitate, with the server via the transceiver, a search query using the search term to identify (i) at least one product available for sale within the retail store, and (ii) information associated with an availability of the at least one product within the retail store, and cause the user interface to display (i) an indication of the at least one product, and (ii) at least a portion of the information associated with the availability of the at least one product within the retail store.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 4-7 depict exemplary user interfaces associated with an application that supports search queries, in accordance with some embodiments.

DETAILED DESCRIPTION

Figure 1A:
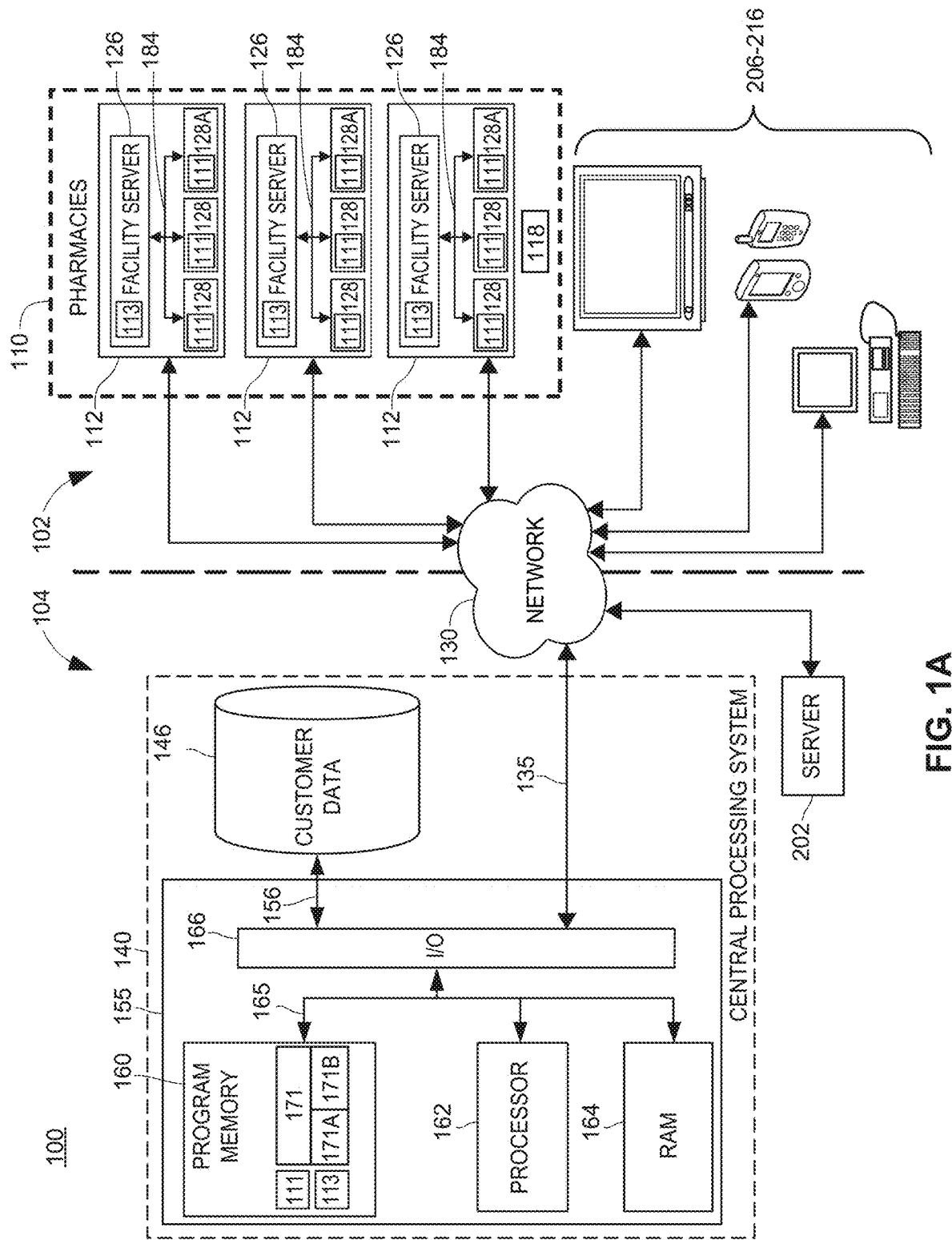
FIGS. 1A-1D illustrate various front end and back end devices and components, and connections therebetween, in accordance with some embodiments.

The systems and methods disclosed here relate generally to improving a retail shopping experience for customers. According to certain aspects, the systems and methods may leverage communications and other hardware and software capabilities of electronic devices to facilitate search queries, and automatically and dynamically provide relevant information resulting from the search queries to the customers.

According to embodiments, an electronic device may communicate with a server associated with a retail store, such as a server within the retail store or a backend server. The retail store may be part of a chain of retail stores associated with a single company or entity. The electronic device in combination with the server may identify a retail store proximate to the electronic device, or otherwise a retail store in which the electronic device is located. The electronic device may enable a user to input a search string associated with products or services available for sale within the retail store, and may communicate the search string to the server which is configured to execute a query according to the search string.

The server may send results from the query to the electronic device, where the results may include products or services that match the search string, locations of the products or services within the retail store, inventory or availability information for the products or services, pricing information, coupons associated with the products or services, and/or the like. The electronic device may dynamically and automatically present the results in a user interface for a user to view and request additional information. The electronic device may support a dedicated application that is associated with the retail store or retail chain, where the application may be capable of facilitating the features and enabling a user to make various selections and control operation of the features.

The embodiments as discussed herein therefore offer benefits to users of the electronic devices as well as to retailers. In particular, the dynamic search results may provide relevant information to supplement a customer's shopping experience within the retail store, thus improving the in-store experience for the customer. Further, by offering the search-related features to customers, retailers are able to build brand loyalty, increase customer retention, and generally increase in-store customer traffic and sales resulting therefrom. It should be appreciated that other advantages and benefits are envisioned.

The systems and methods discussed herein therefore address a challenge that is particular to electronic devices. In particular, the challenge relates to the general inability of electronic devices to be aware of their current environments or settings. In some situations, then, electronic devices are unable to offer certain improved functionalities that may be afforded by certain network connections and having access to information that is normally not able to be ascertained. This is particularly apparent in functionalities which may result in improved experiences for users of the electronic devices. Instead of being limited by functionalities programmed within applications, the electronic devices of the present embodiments may connect to external components to dynamically execute queries associated with products available for sale within a proximity of the electronic devices. Further, as an example, the electronic devices have the capability to dynamically indicate information associated with the products, such as locations within the store, general information associated with the products, and available coupons for the products. Accordingly, the systems and methods are necessarily rooted in computer technology in order to overcome the noted shortcomings that specifically arise in the realm of electronic devices.

Similarly, the systems and methods provide improvements in a technical field, namely, e-commerce. Instead of the systems and methods merely being performed by hardware components using basic functions, the systems and methods employ complex steps that go beyond the mere concept of simply retrieving and combining data using a computer. In particular, the hardware components enable the input of a search query, interface with a server to execute the search query, receive search results including information that is conventionally unavailable, dynamically display the search results, and facilitate the e-commerce functionalities via the network connections. This combination of elements impose meaningful limits in that the operations are applied to improve e-commerce by enabling electronic device users to facilitate enhanced or improved e-commerce features that utilize current network capabilities in a meaningful and effective way.

FIG. 1A illustrates an overall system 100 including various components configured to implement the various embodiments. The system 100 may include a combination of hardware and software components, as well as various data communication channels for communicating data between and among the various hardware and software components. The system 100 may be roughly divided into front-end components 102 and back-end components 104. The front-end components 102 may be primarily disposed within a retail network 110 that may include one or more retail stores 112. The retail stores 112 may be located, by way of example rather than limitation, in separate geographic locations from each other, including different areas of the same city, different cities, or even different states. According to the present embodiments, each of the retail stores 112 may be a "brick and mortar" store that may include one or more physical buildings or structures, where each of the retail stores 112 may accommodate shoppers and customers. A brick and mortal store may be distinguished from an on-line store or website, or a mail-order store.

The front-end components 102 may include a number of workstations 128. The workstations 128 may be local computers located in the various retail stores 112 throughout the retail network 110 and may be capable of executing various applications, such as handing digital image print orders. Retail store personnel (not shown) may use the workstations 128 to access customer information, access images, and payment information, and/or other data.

The retail network 110 may also include one or more warehouses or central-printing facilities 118. The warehouses or central-printing facilities 118 may distribute image prints to the various retail stores 112 in the retail network 110, or may distribute image prints directly to customers. Internet-enabled devices (or client devices) 206-216 (e.g., personal computers, cellular phones, smart phones, internet-enabled televisions, etc.) may be communicatively connected to the retail stores 112 and to a system 140 through one or more digital networks 130, as described below.

Those of ordinary skill in the art will recognize that the front-end components 102 may also comprise a plurality of facility servers 126 disposed at the plurality of retail stores 112 instead of, or in addition to, a plurality of workstations 128. Each of the retail stores 112 may include one or more facility servers 126 that may facilitate communications between the workstations 128 of the retail stores 112 via the digital network(s) 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 may also refer to the facility servers 126, and vice versa. Moreover, environments other than the retail stores 112 may employ the workstations 128 and the servers 126.

The front-end components 102 may communicate with the back-end components 104 via the digital network(s) 130. One or more of the front-end components 102 may be excluded from communication with the back-end components 104 by configuration or by limiting access due to security concerns. For example, the internet-enabled devices 206-216 may be excluded from direct access to the back-end components 104. In some embodiments, the retail stores 112 may communicate with the back-end components via the digital network(s) 130. In other embodiments, the retail stores 112 and the internet-enabled devices 206-216 may communicate with the back-end components 104 via the same digital network 130, but digital access rights, IP masking, and other network configurations may deny access to the internet-enabled devices 206-216.

The digital network(s) 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more servers 202 (described below), the back-end components 104 may include the central processing system 140.

Of course, the retail stores 112 may be communicatively connected to different back-end components 104 having one or more functions or capabilities that are similar to the central processing system 140. The central processing system 140 may include one or more computer processors 162 adapted and configured to execute various software applications and components of the system 100, in addition to other software applications. The central processing system 140 may further include a database 146. The database 146 is adapted to store data related to the operation of the system 100. In particular, the database 146 may store information associated with items/products and/or services that are available for sale in various of the retail stores 112. For example, the database 146 may store locations of the items/products (e.g., aisle number or other information), pricing information, availability and inventory information, coupon(s) associated with the items/products and/or services, and more detailed information associated with the items/products and/ or services (e.g., product descriptions). The central processing system 140 may access data stored in the database 146 when executing various functions and tasks associated with the operation of the system 100. The central processing system 140 may also maintain and update the data stored in the database 146. For example, the central processing system 140 may generate coupons for the items/products and/or services, and update availability and inventory information (such as if a certain product is purchased from one of the retail stores 112). It should be appreciated that additional data and additional techniques for maintaining and updating the data are appreciated.

Although FIG. 1A depicts the system 100 as including the central processing system 140 in communication with three retail stores 112, and various internet-enabled devices 206-216 it should be understood that different numbers of processing systems, retail stores, and devices may be utilized. For example, the digital network(s) 130 (or other digital networks, not shown) may interconnect the central processing system 140 to a plurality of included central processing systems 140, hundreds of retail stores 112, and thousands of internet-enabled devices 206-216. According to the disclosed example, this configuration may provide several advantages, such as, for example, enabling near real-time uploads and downloads of information as well as periodic uploads and downloads of information. This may provide for a primary backup of all the information generated in supported functionalities. Alternatively, some of the retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a program memory 160, the processor 162 (which may be called a microcontroller or a microprocessor), a random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation. The central processing system 140 may implement a server application 113 for providing data to a user interface application 111 operating on the workstations 128.

Figure 1B:
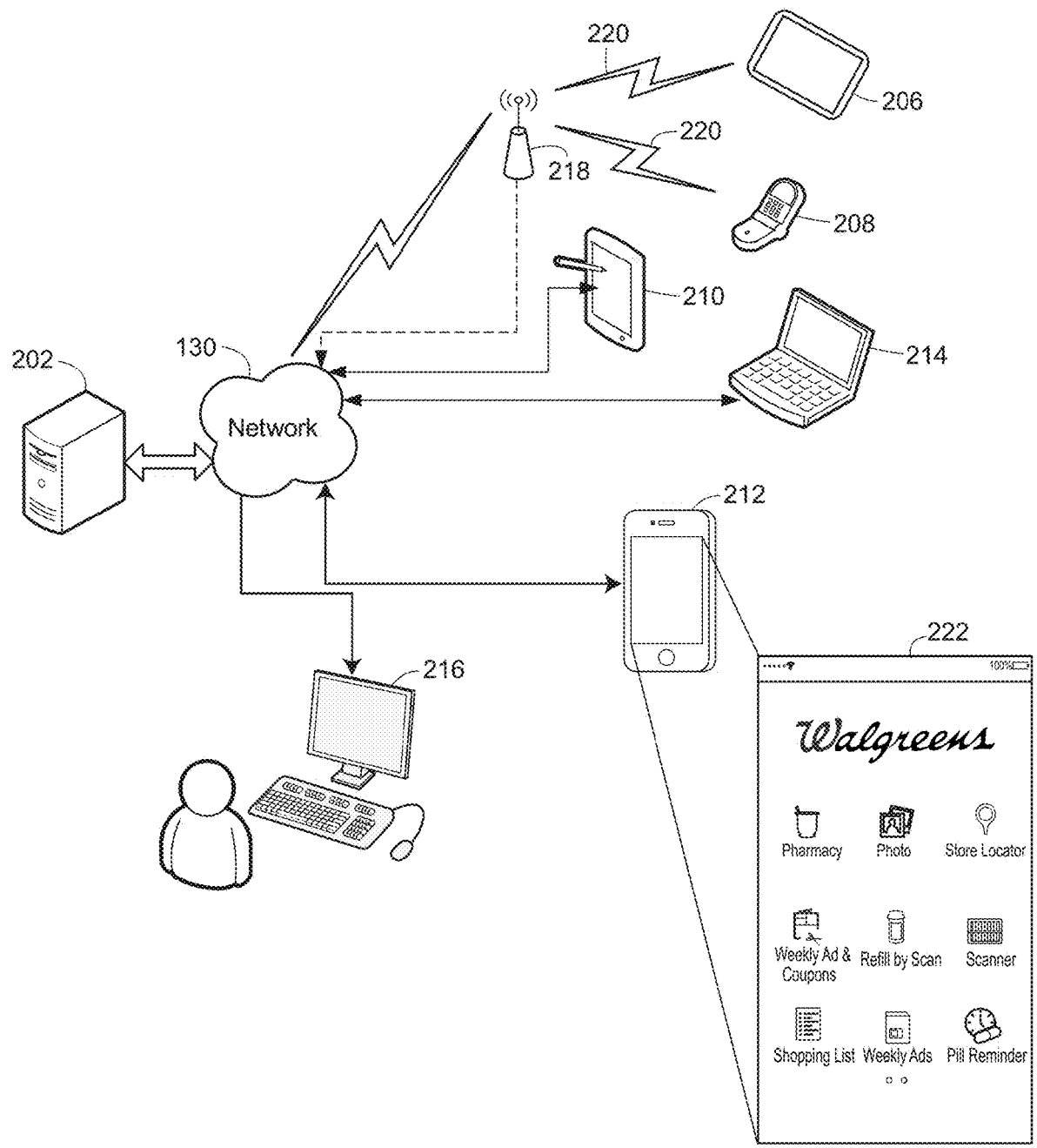

For purposes of implementing the system 100, a user may interact with the server 202 and the retail store systems (e.g., the central processing system 140) via one of the internet-enabled devices 206-216 (e.g., mobile device application, etc.), a specialized application, or a plurality of web pages. FIG. 1B depicts the server 202 connected via the network 130 to the internet-enabled devices 206-216 through which a user may initiate and interact with the system 100 (as shown in FIG. 1A). The internet-enabled devices (or generally, "electronic devices") 206-216 may include, by way of example, a tablet computer 206, an internet-enabled cell phone 208, a personal digital assistant (PDA) 210, a smart phone 212, a laptop computer 214, a desktop computer 216, a portable media player (not shown), and/or others. Of course, any internet-enabled device 206-216 appropriately configured may interact with the remote printing system 100.

The internet-enabled devices 206-216 need not necessarily communicate with the network 130 via a wired connection. In some instances, the internet-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the internet-enabled devices 206-216 may interact with the server 202 to receive web pages or server data from the server 202 and may display the web pages or server data via a client application (described below). For example, the mobile device 212 may display a home screen 222 (i.e., the root or start page at which users enter the client application) of the client application to the user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the retail store web interface, etc. These multiple servers 202 may include a web server, an entity-specific server (e.g. an Apple® server, etc.), a server that is disposed in a retail or proprietary network, an independent third-party server that is not under the control of the entity, or others.

Figure 1C:
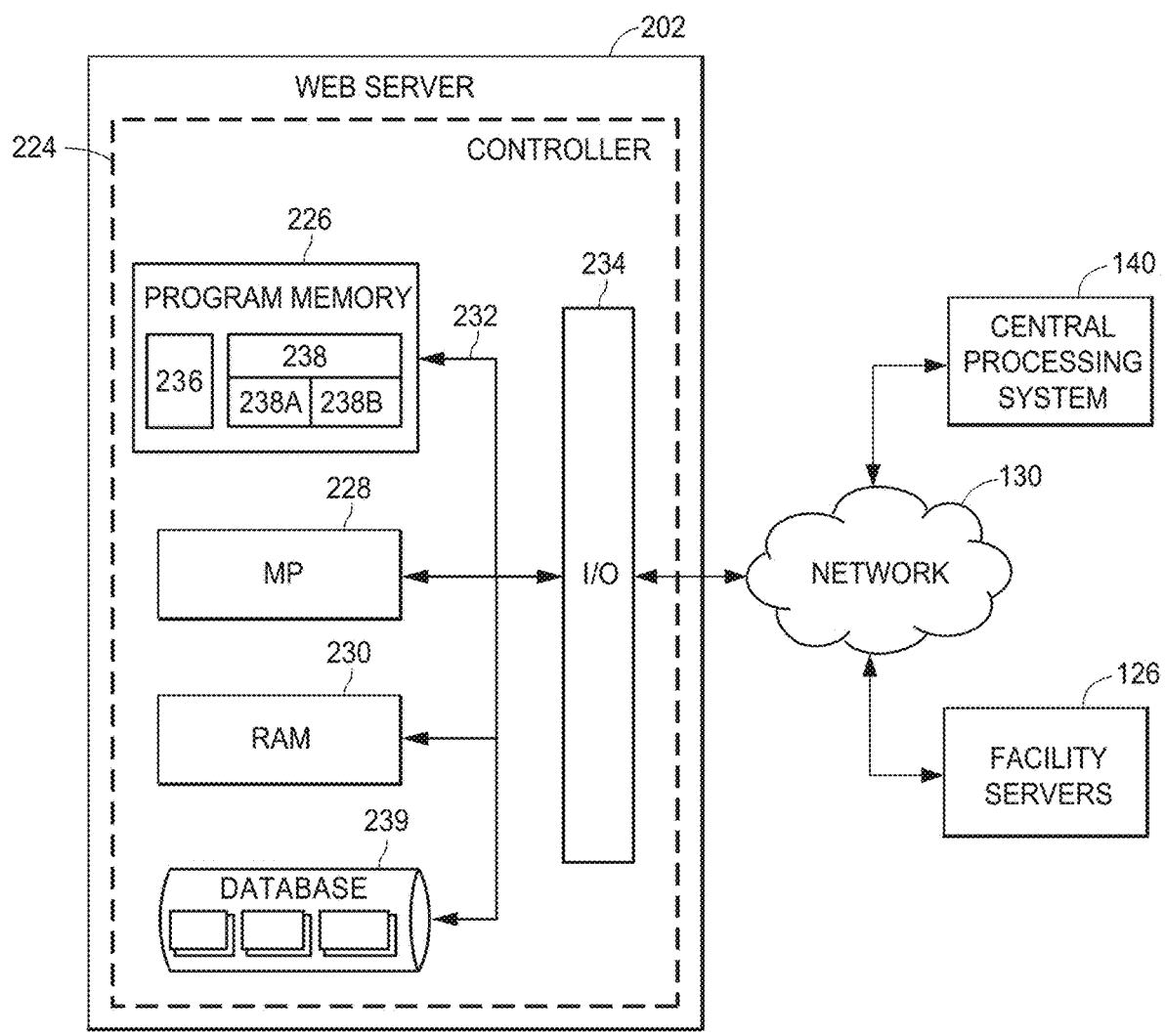

Turning now to FIG. 1C, the server 202, like the facility server 126, may include a controller 224. Similar to the controllers 155 and 170, the controller 224 may include a program memory 226, a microcontroller or a microprocessor (MP) 228, a random-access memory (RAM) 230, and an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data that may be used to interact with the user through the network 130. According to embodiments, the database 239 may store the same or similar data as that stored by the database 146 as discussed with respect to FIG. 1A.

As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the internet-enabled devices 206-216, as depicted in FIG. 1B, FIG. 1C illustrates that the server 202 may also be connected through the network 130 to the central processing system 140 and/or one or more facility servers 126. As described below, the connection of the server 202 to the central processing system 140 may assist in facilitating various functionalities. As a result, the server 202 may act as a routing or interfacing server between the plurality of internet-enabled devices 206-216 and a destination server, namely, the central processing system 140. For example, the server 202 may be configured to communicate with the central processing system 140 and with the internet-enabled devices 206-216 via a multitude of protocols, such as packet-switched protocols, web services, web APIs (Application Programming Interface), etc. The server 202 may also convert (if necessary) and route client application data (not shown) to the appropriate server, such as the central process system 140 for example. Additionally, the server 202 may act as the destination server and need not route any data from the internet-enabled device 206-216.

As shown in FIG. 1C, the program memory 226 and/or the RAM 230 may store various applications for execution by the microprocessor 228. For example, a user-interface application 236 may provide a user interface to the server 202, which user interface may, for example, enable a network administrator to configure, troubleshoot, or test various aspects of the server's operation, or otherwise to access information thereon. A server application 238 may operate to populate and transmit client application data and web pages to the internet-enabled devices 206-216, receive information from the user transmitted back to the server 202, and forward appropriate data to the central processing system 140 and the facility servers 126.

Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules that may facilitate tasks related to implantation of the server 202. By way of example, the module 238A may populate and transmit the client application data and/or may receive and evaluate inputs from the user to receive a data access request, while the module 238B may communicate with one or more of the back end components 104 to fulfill a data access request.

Figure 1D:
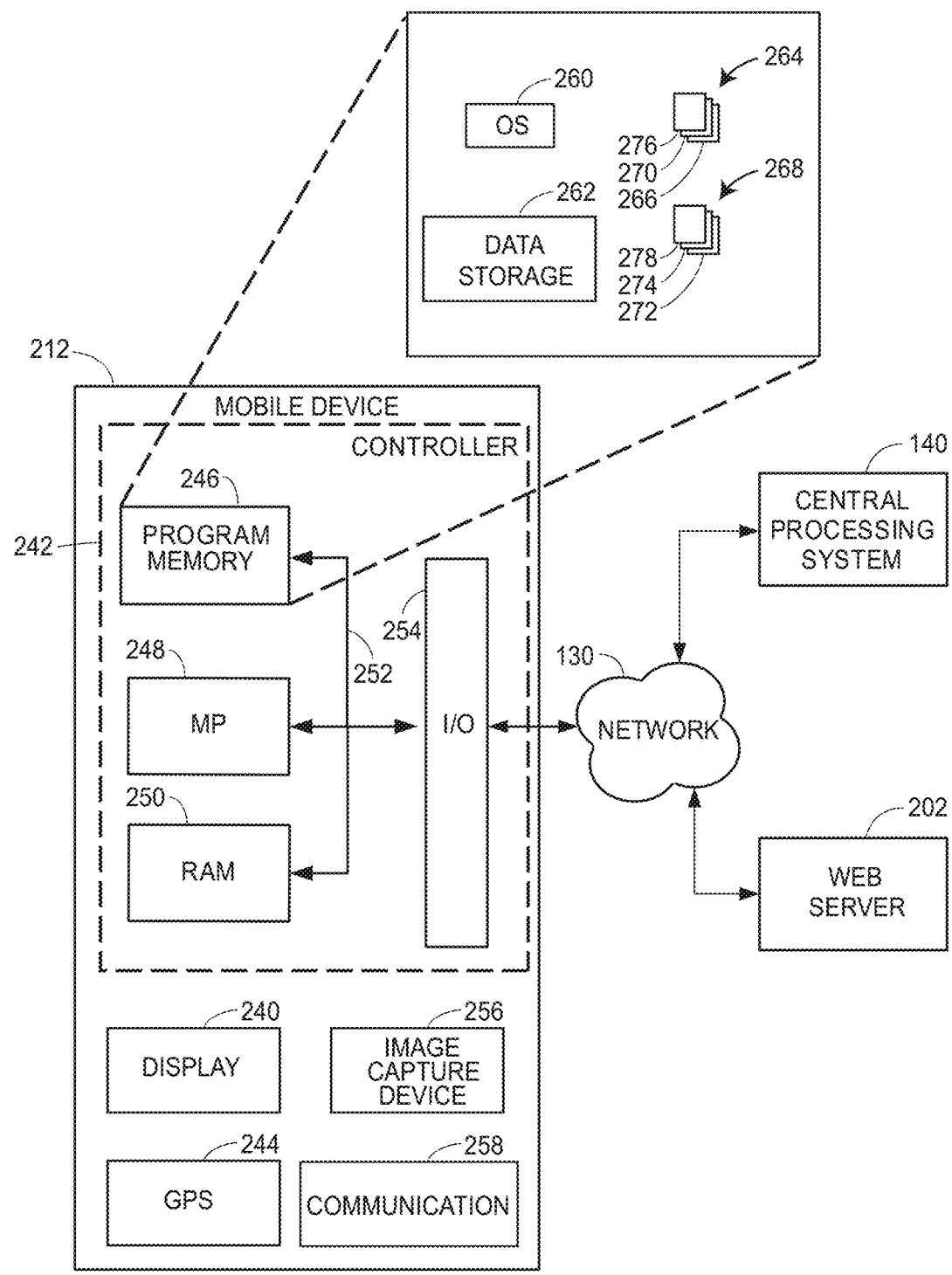

Referring now to FIG. 1D, the mobile device 212 (or any of the internet-enabled devices 206-216) may include a display 240, a Global Positioning System (GPS) unit 244, a communication unit 258, an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which may be interconnected via an address/data bus 252.

The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 262 may include data such as user profiles, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that may reside within the mobile device 212.

The GPS unit 244 may use "Assisted GPS" (A-GPS), satellite GPS, or any other suitable global positioning protocol or system that locates the position of the mobile device 212. For example, A-GPS utilizes terrestrial cell phone towers or Wi-Fi hotspots (e.g., wireless router points) to more accurately and more quickly determine location of the mobile device 212 while satellite GPS generally may be more useful in more remote regions that may lack cell towers or Wi-Fi hotspots. The communication unit or module 258 may communicate with the server 202 via any suitable wireless communication protocol network, such as a wireless telephony network (e.g., GSM, CDMA, LTE, etc.), a WLAN network (or other similar network according to 802.11 standards), a WiMAX network, a Bluetooth network, and/or others.

The image capture device 256 may be a built-in camera within the mobile device 212 or may be an external camera, such as a webcam, that is communicatively coupled with the mobile device 212 (or any other internet-enabled device 206-216). The user-input device or generally a user interface (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user interface (which may include the display 240) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In embodiments, the display 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user.

Another application of the plurality of applications may include a location awareness application 276 that may be implemented as a series of machine-readable instructions for receiving, interpreting, and displaying location information of the mobile device 212 (or any other internet-enabled device 206-216) from the GPS unit 244. One of the plurality of routines may include an image capture routine 272 that coordinates with the image capture device 256 to retrieve image data for use with one or more of the plurality of applications, such as the client application 266, or for use with other routines. Another routine in the plurality of routines may include an image display routine 274 that receives and interprets image data of any type or format for display. Likewise, the image display routine 274 may coordinate with the image capture routine 272 to obtain image data and process the image data into a displayable format for use with the client application 266.

A customer or generally a user may launch the client application 266 from an internet-enabled device, such as one of the internet-enabled devices 206-216, to access the server 202 cooperating with the central processing system 140 and the retail network 110. Additionally, the customer or the user may also launch or instantiate any other suitable user interface application (e.g., the web browser 270, or any other one of the plurality of software applications 264) to access the server 202, the facility servers 126, or the server applications 113. Generally, the term "user" is used when referring to a person who is operating one of the internet-enabled devices 206-216 and is not exclusive of the term "customer." As described above, one or both of the databases 146 and 182, illustrated in FIGS. 1A and 1B, respectively, may include various information about the retail store's customers, as well as basic biographical information about the customer, such as a customer name, a customer address, a customer phone number, coupons redeemed by the customer, and the like. Customer records are among the exemplary data that the system 100 may store on the databases 146 and 182.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 248 (e.g., working in connection with the operating system 260) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 2:
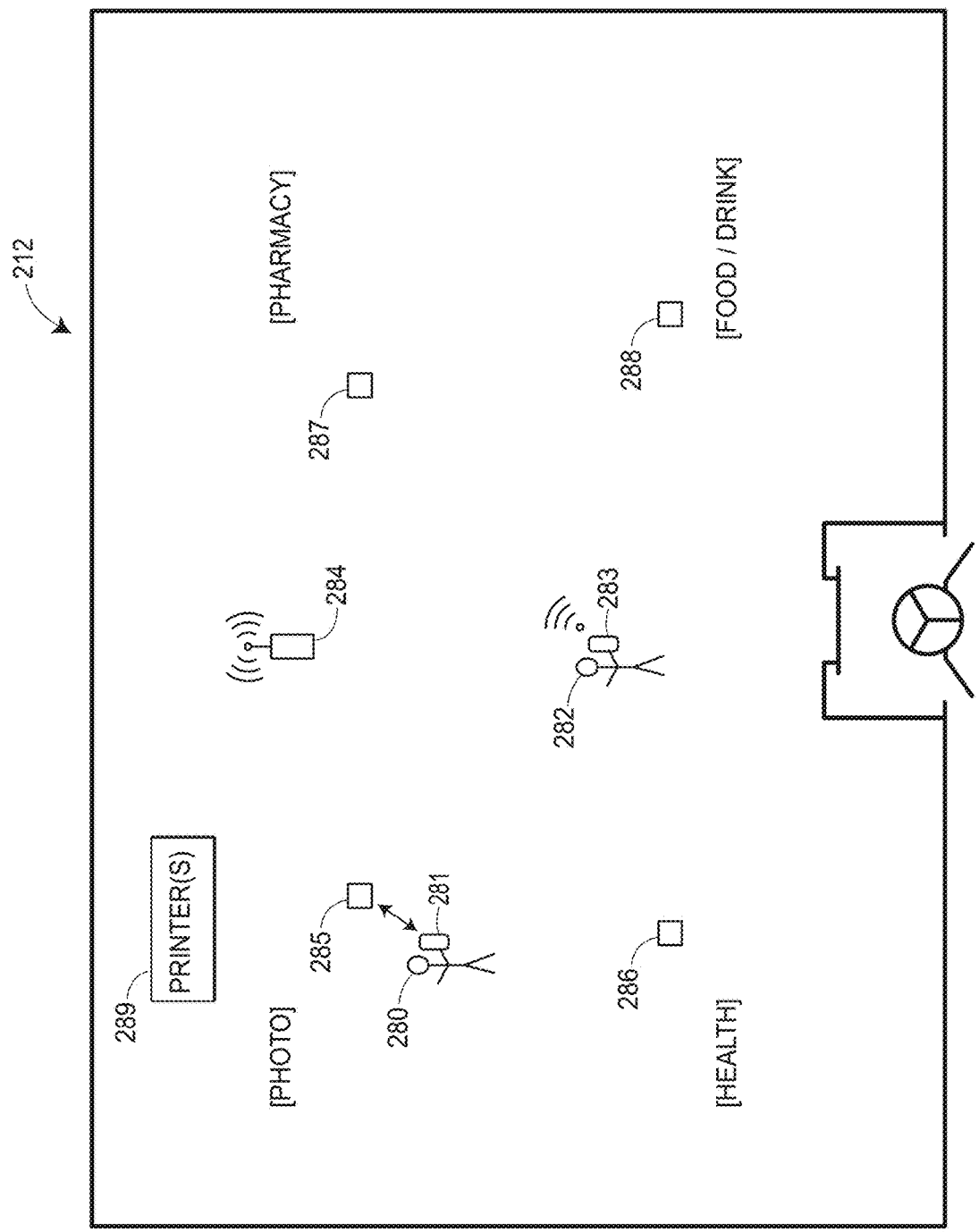
FIG. 2 depicts an exemplary layout of a retail and supported connections, in accordance with some embodiments.

Referring to FIG. 2, depicted an example layout of an example retail store 212 (such as the retail store 112 as described with respect to FIG. 1A). In the example depicted in FIG. 2, the retail store 212 is a pharmacy that may include different departments or sections (as shown: photo, pharmacy, health, and food/drink); however it should be appreciated that other types of retail stores and general environments are envisioned. Each of the different departments or sections may include various components, devices, or the like. For example, as depicted in FIG. 2, the photo section may include one or more printers 289 that may be configured to print digital images.

Customers or users 280, 282 may enter the retail store, browse in the various departments or sections, and/or purchase any desired items/products or services. Each of the customers 280, 282 may be equipped with a respective electronic device 281, 283 (such as one of the Internet-enabled devices 206-216 as described with respect to FIG. 1A). Each electronic device 281, 283 may be any type of portable electronic device, for example, a notebook computer, a mobile phone, a Personal Digital Assistant (PDA), a smart phone, a tablet computer, a multimedia player, an MP3 or MP4 player, a digital or analog broadcast receiver, a remote controller, or any other electronic apparatus.

According to embodiments, the retail store 212 may support various wireless local area network s (WLAN) and wireless personal area networks (WPAN) to which the electronic devices 281, 283 may connect. In one particular implementation, the retail store 212 may include one or more wireless access points (AP) 284 to which the electronic devices 281, 283 may connect via a WLAN connection. Accordingly, when the electronic devices 281, 283 are connected to the AP 284, the electronic devices 281, 283 may be connected to the local area network implemented within the retail store 212 (i.e., the retail store 212 may be an Internet "hotspot").

The retail store 212 may also be configured with a plurality of transmitters 285, 286, 287, 288 or "beacons" that may be disposed throughout the area of the retail store 212. Although FIG. 2 depicts the retail store 212 supporting four (4) transmitters 285-288, it should be appreciated that the retail store 212 may support fewer or additional transmitters. The plurality of transmitters 285-288 may be disposed in various locations of the retail store 212 (e.g., each department may include a single transmitter). Each of the plurality of transmitters 285-288 may be secured to various components of the retail store 212 (e.g., shelves, ceiling, etc.). Each of the plurality of transmitters 285-288 may include any combination of hardware and software components, including a module for transmitting or broadcasting signals. Further, each of the plurality of transmitters 285-288 may be configured to be powered by a battery or via another power source.

According to embodiments, each of the plurality of transmitters 285-288 may support one or more short-range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Each of the plurality of transmitters 285-288 may also be configured to broadcast or transmit a signal that may include any stored data. In one embodiment, each of the plurality of transmitters 285-288 may continuously broadcast a signal that may include a unique identifier of the corresponding transmitter 285-288.

The signals that the transmitters 285-288 broadcast may have an associated detection range depending on the type of communication protocol. Generally, Bluetooth® signals have a range of 100 meters and BLE signals have a range of 50 meters. The detection range of the signal that the transmitters 285-288 broadcast may also vary and may be programmable. For example, the range of a first signal that is broadcast by the transmitter 285 may be fifteen (15) meters while the range of a second signal that is broadcast by the transmitter 286 may be twenty-five (25) meters.

When one of the electronic devices 281, 283 is within broadcast range of one of the transmitters 285-288, the electronic devices 281, 283 can detect and receive the signal. In particular, a communication module of the electronic devices 281, 283 that supports a short range communication protocol (e.g., a BLE chip) can detect and receive the signal. For example, FIG. 2 depicts the electronic device 281 detecting the signal broadcast by the transmitter 285.

According to embodiments, the electronic devices 281, 283 (and any application executing thereon) may facilitate various when connected to various of the connections within the retail store 212. In particular, the electronic devices 281, 283 may detect one or more of the transmitters 285-288, and/or may connect to (or may detect the availability of) the access point 284, and may in turn connect to an on-site server or a remote server to facilitate a search query for products or services available for sale within the retail store 212.

Figure 3:
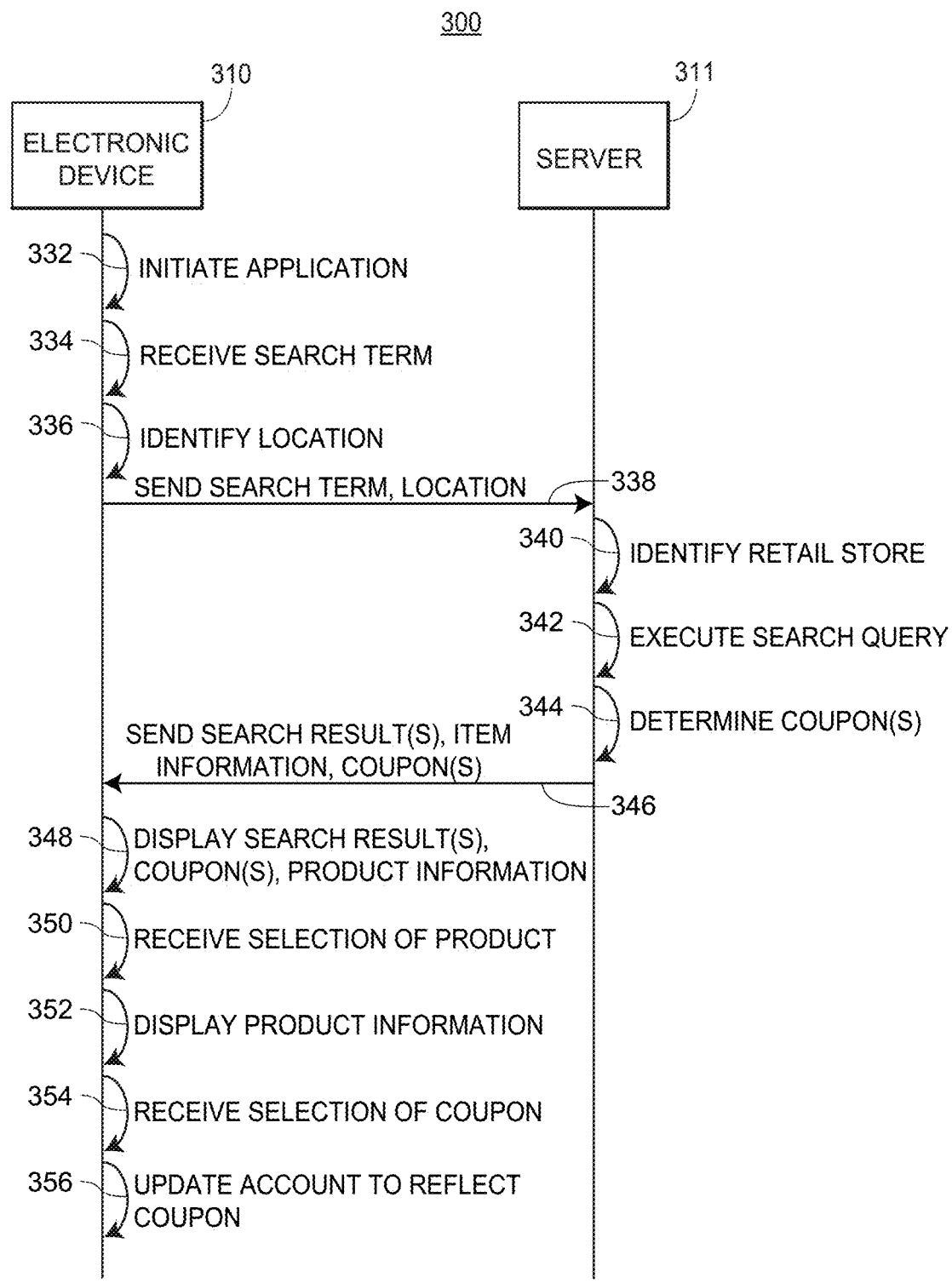
FIG. 3 is a signal diagram associated with improving a shopping experience within a retail store, in accordance with some embodiments.

FIG. 3 depicts a signal diagram 300 associated with facilitating searches for products available for sale in a retail store. In particular, the signal diagram 300 depicts supplementing and enhancing search queries for the products. FIG. 3 includes an electronic device 310 and a server 311. According to embodiments, a user may operate the electronic device 310 within a retail store or similar environment. Further, the server 311 may be located within the retail store or similar environment, or may be a back-end component configured to directly communicate with the electronic device 310. In an implementation, if the server 311 is a back-end component, the electronic device 310 may connect to an in-store server (e.g., via a WLAN connection), which may communicate with the server 311. Although the embodiments describe facilitating searches for products available for sale in a retail store, it should be appreciated that the embodiments may also extend to available services.

The signal diagram 300 may begin when the electronic device 310 initiates (332) an application stored thereon, where the application may be associated with the retail store or an associated retail chain. For example, if the retail store is a pharmacy, then the application may be offered by the associated pharmacy company. The application may enable the user to facilitate various operations and generally make selections through the electronic device 310, such as via a user interface of the electronic device 310. The electronic device 310 may connect to the server 311 prior to or in response to initiating the application. During operation of the application, the electronic device 310 may connect to, send data to, and receive data from the server 311, either directly or via an in-store server. According to embodiments, the electronic device 310 need not be located within the retail store for the application to execute.

The application may support various features or functionalities. In particular, one of the features is a search feature that enables users to search for products or items that may be for sale within the retail store. Accordingly, the electronic device 310 may receive (334) a search term from a user of the electronic device. In an implementation, the user may manually input the search term. In another implementation, the electronic device 310 may support voice recognition technology whereby the user may dictate a phrase that the electronic device 310 may process to determine the search term. Additionally, in an implementation, the electronic device 310 may support scanning or capturing a code, identification, or the like (e.g., a UPC scanner, a QR code reader, etc.) associated with a particular product.

In a further implementation, the electronic device 310 may automatically determine a search term based on a context or environment of the electronic device 310. For example, if the electronic device 310 connects to an in-store transmitter or "beacon" in an aisle where pain relievers are located, the electronic device 310 may determine the search term to be "pain reliever." For further example, the electronic device 310 may determine or access (e.g., via the server 311) certain search terms that may be popular or "trending," and may automatically a search field with one such search term.

The electronic device 310 may also identify (336) its location. In an implementation, the electronic device 310 may identify its GPS coordinates. In another implementation, the electronic device 310 may detect one or more available WLAN connections each having an associated service set identification (SSID) that identifies the corresponding network and a corresponding location (e.g., a location of a retail store). In embodiments, the electronic device 310 may automatically connect to the in-store network, such as if the electronic device 310 has stored the SSID of the in-store network. Further, multiple retail stores may maintain consistent SSIDs such that the electronic device 310 may automatically connect to the in-store network of any retail store in which it is located, even if the electronic device 310 has previously not connected to that in-store network. In a further implementation, the electronic device 310 may connect to an in-store transmitter that has an associated location within the retail store. In identifying its location, the electronic device 310 may identify a retail store in which the electronic device 310 may be located, where the retail store may have an identification code (e.g., a unique number). In an embodiment, the electronic device 310 may be configured to continuously monitor its location, and may automatically determine when it is located near or within the retail store. It should be appreciated that additional techniques for determining a location of the electronic device 310 are appreciated.

The electronic device 310 may send (338) the search term and the location to the server 311. It should be appreciated that the electronic device may send the search term and the location in separate communications, at separate times, and/or the like. For example, the electronic device 310 may first identify its location and send the location to the server 311, then receive the search term and send the search term to the server 311. Further, the location may be in the form of identifying data, such as an SSID of an in-store WLAN connection, an identification of an in-store transmitter, or an identification of the retail store. The server 311 may identify (340), based on the location of the electronic device 310 or other data (e.g., an identification of a transmitter to which the electronic device 310 connects), a retail store in which the electronic device 310 may be located or which is in proximity to (or nearest to) the electronic device 310. In an implementation, the may be multiple retail stores in proximity to the electronic device 310, and the server 311 may identify the retail store closest to the electronic device 310.

The server 311 may also execute (342) a search query using the received search term to identify relevant products or items that are available for sale. In executing the search query, the server 311 may account for the retail store identified in (340) to identify products for sale within the retail store. The server 311 may also access, identify, or determine information associated with the products, such as pricing information, availability (e.g., available in store or out of stock, quantity available), location within the store (e.g., aisle 6), product images and/or descriptions, and/or other information.

In one implementation, the server 311 may serially or concurrently execute multiple search queries in multiple databases that may store different information, where the queries may complete at different or varied times. For example, one database may store product description information, another database may store availability information, and another database may store product location information. The server 311 may further access, identify, or determine (344) any coupon(s) for the relevant products identified from the search query. According to embodiments, the server 311 may identify existing coupons for the products, or may dynamically and automatically generate coupon(s) for the products. For example, the server 311 may determine that multiple users are searching for the same type of soap, and may dynamically generate a coupon for that soap.

It should be appreciated that the server 311 may execute the search quer(ies) using various techniques, algorithms, or the like, and according to varying degrees of granularity. For example, the server 311 may search for universal coupons or store-specific coupons for an identified product. For further example, the server 311 may search for products that are located in a particular aisle of a retail store. In embodiments, the server 311 may dynamically generate a search term using information received from the electronic device 310. For example, if the information from the electronic device 310 indicates that it is located in Aisle 9 of a particular retail store, the server 311 may perform a search query for the most popular products located in Aisle 9.

The server 311 may send (346), to the electronic device 310, the results of the search query (i.e., the item(s) or product(s) available for sale), any information associated with the item(s) or product(s), and any coupon(s). It should be appreciated that the server 311 may send any combination of this information, as well as varying amounts of this information. For example, there may be more search results for the search query "toothpaste" than for the search query "garbage bags." Further, the server 311 may automatically send the results of the search query to the electronic device 310 as the server 311 determines or identifies the results. In particular, the server 311 may serially receive search results from various of the databases to which the server 311 interfaces, and may in turn send the search results to the electronic device 310.

The electronic device 310 may display (348) the results of the search query (i.e., the item(s) or product(s) available for sale), any information associated with the item(s) or product(s), and any coupon(s). In embodiments, the electronic device 310 may display the information via a user interface or other type of display device, where the user may interface with the displayed content to view certain information, make selections, and/or facilitate other functionalities. It should be appreciated that the electronic device 310 may display the information using any ordering technique or convention. For example, the electronic device 310 may prioritize, in the display, coupons that are specific to the retail store identified in (340) (e.g., by highlighting these coupons), as compared to coupons that may be accepted at additional retail locations. In some implementations, the retail store may offer various sponsored products or otherwise products that may be promoted by a manufacturer or distributor, in which case the electronic device 310 may prioritize the sponsored products (e.g., by displaying these products at the top of a list).

It should be further appreciated that the electronic device 310 may display various combinations and types of information. In particular, the electronic device 310 may display images of any items or products that are identified from the search query, their location within the retail store (e.g., an aisle number), prices for the items or products (which may be specific to the retail store), inventory information for the items or products at the retail store, descriptions associated with the items or products, and/or other information. In some scenarios, the retail store may not have any availability of a particular item or product, in which case the server 311 may identify any nearby retail stores that have the item or product available (e.g., using the location of the electronic device 310 and any stored product inventory data), and send the availability information to the electronic device 310, where the electronic device 310 may indicate the nearby retail stores and the availability information.

In some implementations, the electronic device 310 may dynamically update the displayed information, such as if the electronic device 310 receives new or updated search results from the server 311. For example, after initially sending the information in (346), the server 311 may identify or generate a coupon associated with an identified product, and send the coupon to the electronic device 310, where the electronic device 310 may update the display to indicate the coupon. For further example, the electronic device 310 may dynamically update inventory information for a particular product, such as if additional inventory is detected or if another customer purchases the particular product. Further, for example, the electronic device 310 may dynamically update the display to indicate new or updated search results as they are received from the server 311. In embodiments, the electronic device 310 may re-prioritize the display based on various priority rules, more relevant identified products, or other metrics. It should be appreciated that the electronic device 310 may dynamically update the displayed information in other various ways.

The electronic device 310 may receive (350) a selection of a displayed product. In particular, the user may directly select the product via the user interface. The electronic device 310 may display (352) any information associated with the product. According to embodiments, the electronic device 310 may display image(s) of the product, a location within the retail store (e.g., an aisle number), a price for the product (which may be specific to the retail store), an inventory for the item at the retail store, a description associated with the item, and/or other information. Accordingly, the user is able to efficiently and effectively locate the item with the retail store and view information associated with the item, among other benefits.

The electronic device 310 may receive (354) a selection of a coupon, such as a coupon displayed in a user interface and/or associated with an item displayed in the user interface. In particular, the user may select to "clip" the coupon or otherwise redeem the coupon. In response to receiving the selection of the coupon, the electronic device 310 may update (356) account information of the user to reflect the selected coupon. In this regard, when the user checks out at a point of sale (POS) terminal and enters his/her account identification (e.g., an account number), the discount associated with the coupon may be applied to the transaction. Accordingly, the user is afforded an efficient and effective way to redeem coupons and apply them to an account.

FIGS. 4-7 depict example interfaces associated with the described embodiments. An electronic device (such as the electronic device 310 as described with respect to FIG. 3) may be configured to display the example interfaces via a user interface. In an implementation, the example interfaces may be associated with a dedicated application, for example an application offered for download by a retail chain. Each of the example interfaces may enable a user of the electronic device to make selections, input data or information, and generally facilitate operation of the functionalities indicated in the example interfaces. It should be appreciated that the graphical content of the example interfaces is exemplary, and that the example interfaces may include alternate, additional, and fewer graphical content.

FIG. 4 depicts an example interface 400 that depicts various functionalities that may be facilitated by a user of the electronic device. For example, as shown in FIG. 4, the functionalities may include viewing prescription and health data, shopping for products, ordering photos, browsing a weekly ad and coupons, viewing refill information, and viewing rewards card information.

The interface 400 may indicate a retail store 401 (e.g., by displaying an address of the retail store 401) that may be in proximity to the electronic device, such as if the electronic device is located within the retail store 401, or if the retail store 401 is the store location closest to the electronic device. As discussed herein, the electronic device may identify the retail store 401 via a geolocation technique, or other techniques. The interface 400 may include a store selection 403 that may enable the user to select another retail store location.

According to embodiments, the interface 400 may enable the user to facilitate search functionalities. In particular, the electronic device may receive a search string from the user and execute a search query according to the search string, whereby the user may input the search string using multiple techniques. As shown in FIG. 4, the interface 400 may include a search by voice selection 404 selection and a shop products selection 402. If the user selects the search by voice selection 404, the electronic device may record audio and analyze the audio using a voice recognition technique to determine a search string. If the user selects the shop products selection 402, the electronic device may enable the user to manually input a search string via a software keyboard or peripheral device. The electronic device may also support scanning or capturing a code, identification, or the like associated with a particular product.

After receiving a search term from the user, the electronic device may execute a search query according to the search term to identify relevant items or products available for sale within the retail store 401. FIG. 5 illustrates an interface 500 associated with executing a search query. In particular, the search query is "batteries," which the user may input via the search by voice selection 404 or the shop products selection 402 (or another technique). The interface 500 may include various information associated with the search query. In particular, the interface 500 may include location information 507 which indicates where, within the retail store, the identified products are located (as shown: alkaline batteries are located in aisle 9). Further, the interface 500 includes a set of coupons 505 for products that correspond to the search query. Each of the coupons 505 includes a "clip to card" selection that enables the user to associate the selected coupon with an account of the user.

The interface 500 further includes a set of products 508, 509 identified based on the search query. As shown in FIG. 5, the product 508 is a pack of four AAA batteries and the product 509 is a back of four AA batteries. Each of the products 508, 509 indicates a price that corresponds to the price of the product within the retail store. It should be appreciated that the displayed price may be different from (or the same as) the price of the same product that is available at a different retail location(s). The interface 500 further includes a more selection 510 that, when selected by the user, causes the electronic device to display any additional products identified from the search query. As discussed herein, the electronic device may dynamically update the interface 500 as the electronic device receives additional search results, such as additional products and/or additional coupons.

Figures 6, 7:
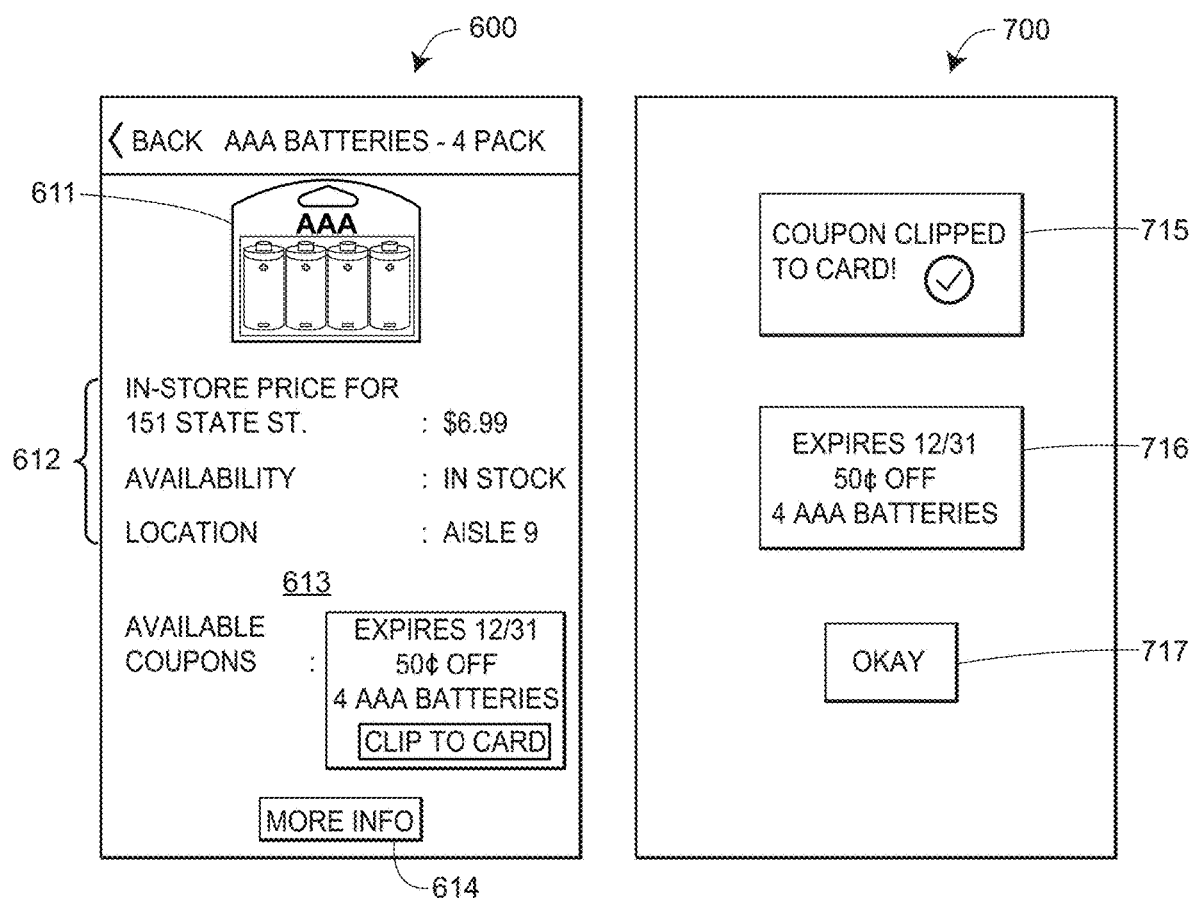

FIG. 6 illustrates an interface 600 that details information associated with a selected product. In particular, the electronic device may display the interface 600 in response to receiving a selection of the product 508 included in the interface 500 of FIG. 5. The interface 600 may include various information associated with the selected product, including one or more images 611 and a set of additional information 612. As shown in FIG. 6, the set of additional information 612 may include an in-store price for the product (i.e., a price specific to that retail location), an availability (which may be in the form of "in stock," "out of stock," or an inventory amount), and a location where the product may be found within the store. The interface 600 may also detail a set of available coupons 613 for the product, where the user may select to "clip" any of the coupons 613 to an account of the user. Additionally, the interface 600 may include a "more info" selection 614 that may cause the electronic device to access and display more information associated with the product.

FIG. 7 illustrates an interface 700 that details information associated with a selected coupon. In particular, the electronic device may display the interface 700 in response to receiving a selection of the available coupon 613 included in the interface 600 of FIG. 6. The interface 700 may display a confirmation 715 that the coupon has been "clipped" to the card of the user (i.e., has been saved to the account of the user), and may also display details 716 of the coupon itself. The interface 700 may further include an "okay" selection 717 that enables the user to dismiss the interface 700 and return to another interface.

Figure 8:
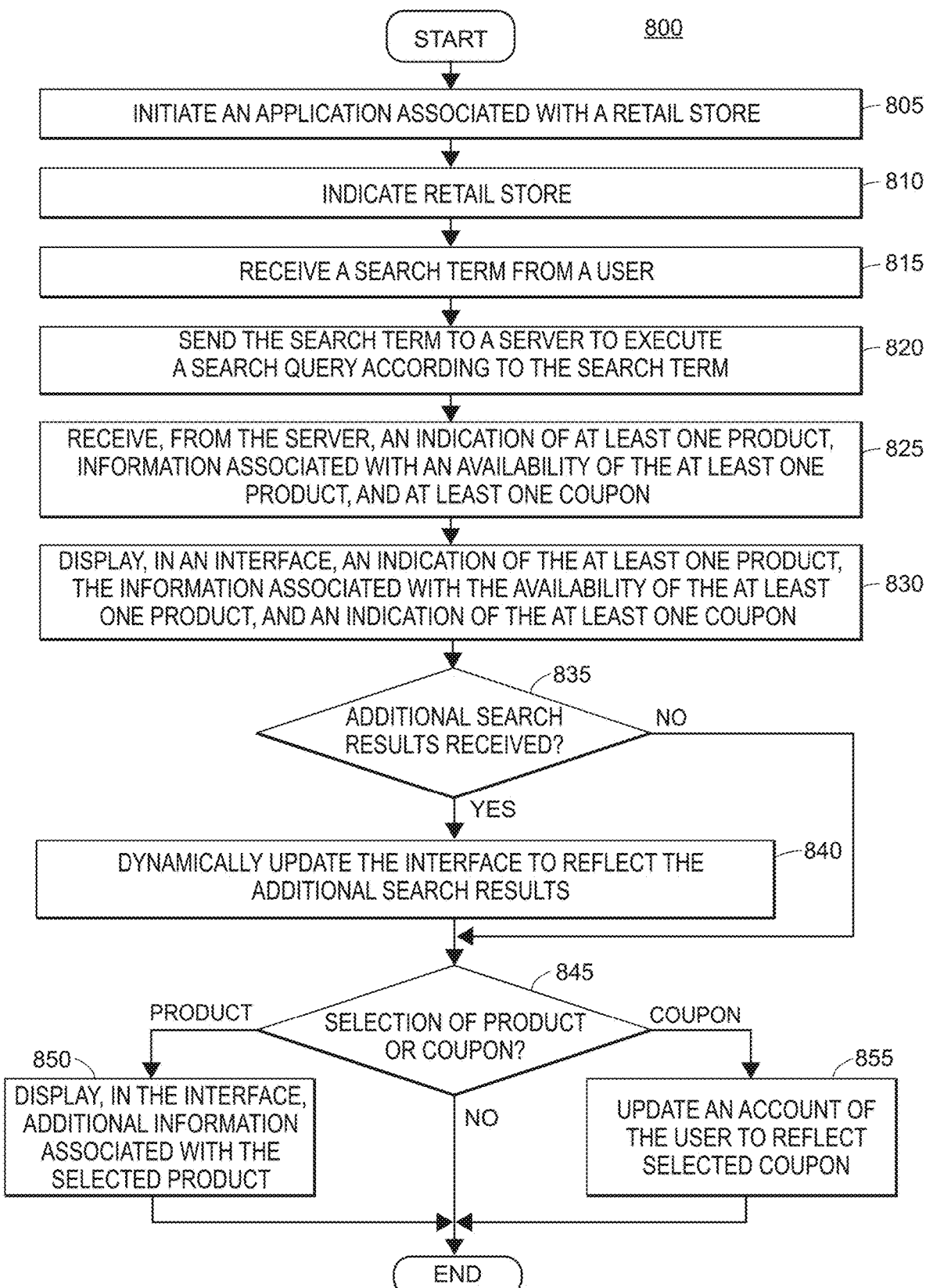
FIG. 8 depicts a flowchart of a method for improving a shopping experience within a retail store, in accordance with some embodiments.

FIG. 8 is a flow chart of an example method 800 of improving a shopping experience within a retail store. The method 800 may be performed by an electronic device that supports an application associated with the retail store. The electronic device may be configured to communicate with a server, such as a backend server or a server within the retail store. It should be appreciated that the method 800 is merely exemplary and may include alternative or additional functionalities.

The method 800 may begin when the electronic device initiates (block 805) the application associated with the retail store. In embodiments, a user of the electronic device may select to initiate the application, or the electronic device may automatically initiate the application in response to a certain trigger (e.g., connecting to an in-store network). The electronic device may indicate (block 810) the retail store, such as via an interface of the application. In an implementation, the electronic device may determine its location (e.g., via a location module), and the server (or the electronic device) may identify the retail store based on the determined location. In another implementation, the electronic device may connect to an in-store transmitter or an in-store network and may identify the retail store based on the connection.

The electronic device may receive (block 815) a search term from a user. In embodiments, the electronic device may receive the search term via one or more techniques, such as via inputted text, a voice search, or a scan of a unique product identifier or other type of code. The electronic device may send (block 820) the search term to the server to execute a search query according to the search term. In embodiments, the electronic device may additionally send its determined location or an identification of the retail store to the server, where the server may execute the search query further according to the location or the identified retail store.

The electronic device may receive (block 825), from the server, result(s) of the search query, including an indication of at least one product, information associated with an availability of the at least one product, and optionally at least one coupon. After receiving the result(s), the electronic device may display (block 830), in an interface, an indication of the at least one product, the information associated with the availability of the at least one product, and optionally an indication of the at least one coupon. According to embodiments, the information associated with the availability of the at least one product may include at least a location of the at least one product within the retail store, pricing information, inventory information, and/or the like. In an implementation, the at least one product may be not be available in the retail store, in which case the electronic device (in combination with the server) may determine an additional retail store that has the at least one product available, and display, in the user interface, an indication of the additional retail store.

The electronic device may determine (block 835) whether additional search results are received (i.e., whether the server has identified additional search results). If the electronic device does not receive additional search results ("NO"), processing may proceed to block 845. If the electronic device receives additional search results ("YES"), the electronic device may dynamically update (block 840) the interface to reflect the additional search results. According to embodiments, the electronic device may display any additional products and information relating thereto, any additional coupons, and/or the like. Further, the electronic device may prioritize certain products according to a set of rules or other constraints.

At block 845, the electronic device may determine whether a product or coupon has been selected, for example by the user via the interface. If a product or coupon has not been selected ("NO"), processing may end or proceed to other functionality. If a product has been selected ("PRODUCT"), the electronic device may display (block 850), in the interface, additional information associated with the selected product. In embodiments, the additional information may be included in the information received in block 825, and/or may be other information. If a coupon has been selected ("COUPON"), the electronic device may update (block 855) an account of the user to reflect the selected coupon. In this regard, the user may apply/use the coupon during checkout for the associated product.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method in an electronic device of improving a shopping experience within a retail store having a plurality of products available for sale, the retail store configured with a plurality of hardware transmitters respectively disposed at a plurality of sections within the retail store, the method comprising:

initiating, by a processor, an application associated with the retail store on the electronic device;

connecting, by the processor, to a hardware transmitter, of the plurality of hardware transmitters, disposed at a section, of the plurality of sections, within the retail store;

based on connecting to the hardware transmitter disposed at the section, automatically determining, by the processor, (i) a subset of the plurality of products located in association with the section at which the hardware transmitter is disposed, and (ii) a search term based on the subset of the plurality of products;

facilitating a search query using the search term to identify (i) at least one product, of the plurality of products, available for sale within the retail store, (ii) information associated with an availability of the at least one product within the retail store, (iii) a first coupon that is specific to the retail store, and (iv) a second coupon that is accepted at both the retail store and an additional retail store, wherein the first coupon and the second coupon are associated with the at least one product;

determining, by the processor based on a set of priority rules, how to prioritize the first coupon and the second coupon;

displaying, in an interface associated with the electronic device, (i) an indication of the at least one product, (ii) at least a portion of the information associated with the availability of the at least one product within the retail store, including an inventory amount for the at least one product in the retail store, (iii) the first coupon that is specific to the retail store, and (iv) the second coupon that is accepted at both the retail store and the additional retail store, wherein the first coupon is displayed in a prioritized position relative to the second coupon based on the determined priority, and wherein the first coupon is displayed concurrently with the second coupon;

after displaying the first coupon and the second coupon, receiving, from the server, an indication of a third coupon associated with the at least one product;

dynamically updating the interface to display (i) the third coupon, and (ii) an update to the inventory amount for the at least one product in the retail store;

receiving, via the interface associated with the electronic device, a selection of the first coupon; and in response to receiving the selection of the first coupon:
updating an account of the user to reflect that the coupon is associated with the account, and
displaying, in the interface, a confirmation that the coupon is associated with the account.

2. The computer-implemented method of claim 1, further comprising:
identifying a location of the electronic device;
sending, to a server, the location of the electronic device; and
receiving, from the server, an indication of the retail store based on the location of the electronic device.

3. The computer-implemented method of claim 1, further comprising:
displaying, in the interface, an indication of the retail store.

4. The computer-implemented method of claim 1, wherein facilitating the search query using the search term comprises:
sending the search term to a server to execute the search query according to the search term; and
receiving, from the server, the indication of the at least one product, and the information associated with the availability of the at least one product within the retail store.

5. The computer-implemented method of claim 4, further comprising:
receiving, from the server, an indication of an additional product, and additional information associated with an availability of the additional product within the retail store; and
dynamically updating the interface to reflect the additional product and at least a portion of the additional information associated with the availability of the additional product within the retail store.

6. The computer-implemented method of claim 1, further comprising:
receiving, from the user of the electronic device, a selection of the at least one product; and
in response to receiving the selection, displaying, in the interface, an additional portion of the information associated with the availability of the at least one product within the retail store.

7. The computer-implemented method of claim 1, wherein the information associated with the availability of the at least one product within the retail store indicates that the at least one product is not available within the retail store; and further comprising:
determining, based at least in part on a location of the electronic device, an alternative retail store that has the at least one product available; and
displaying, in the interface, an indication of the alternative retail store.

8. An electronic device comprising:
a transceiver configured to connect to a server associated with a retail store having a plurality of products available for sale, the retail store configured with a plurality of hardware transmitters respectively disposed at a plurality of sections within the retail store;
a user interface configured to display content;
a memory storing an application associated with the retail store; and
a processor interfacing with the transceiver, the user interface, and the memory, and configured to:
initiate the application associated with the retail store,
connect to a hardware transmitter, of the plurality of hardware transmitters, disposed at a section, of the plurality of sections, within the retail store,
based on connecting to the hardware transmitter disposed at the section, automatically determine (i) a subset of the plurality of products located in association with the location of section at which the hardware transmitter is disposed, and (ii) a search term based on subset of the plurality of products,
facilitate, with the server via the transceiver, a search query using the search term to identify (i) at least one product, of the plurality of products, available for sale within the retail store, (ii) information associated with an availability of the at least one product within the retail store, including an inventory amount for the at least one product in the retail store, (iii) a first coupon that is specific to the retail store, and (iv) a second coupon that is accepted at both the retail store and an additional retail store, wherein the first coupon and the second coupon are associated with at least one product,
determine, based on a set of priority rules, how to prioritize the first coupon and the second coupon,
cause the user interface to display (i) an indication of the at least one product, (ii) at least a portion of the information associated with the availability of the at least one product within the retail store, (iii) the first coupon that is specific to the retail store, and (iv) the second coupon that is accepted at both the retail store and the additional retail store,
wherein the first coupon is displayed in a prioritized position relative to the second coupon based on the determined priority, and
wherein the first coupon is displayed concurrently with the second coupon,
after causing the user interface to display the first coupon and the second coupon, receive, from the server via the transceiver, an indication of a third coupon associated with the at least one product,
cause the user interface to dynamically update to display (i) the third coupon, and (ii) an update to the inventory amount for the at least one product in the retail store,
receive, via the user interface, a selection of the first coupon, and
in response to receiving the selection of the first coupon:
update an account of the user to reflect that the coupon is associated with the account, and
cause the user interface to display a confirmation that the coupon is associated with the account.

9. The electronic device of claim 8, further comprising:
a location module;
wherein the processor is further configured to:
identify, using the location module, a location of the electronic device, send, to the server via the transceiver, the location of the electronic device, and receive, from the server via the transceiver, an indication of the retail store based on the location of the electronic device.

10. The electronic device of claim 8, wherein the processor is further configured to:

cause the user interface to indicate the retail store.

11. The electronic device of claim 8, wherein to facilitate the search query using the search term, the processor is configured to:

send the search term to the server via the transceiver, wherein the server executes the search query according to the search term, and receive, from the server via the transceiver, the indication of the at least one product, and the information associated with the availability of the at least one product within the retail store.

12. The electronic device of claim 11, wherein the processor is further configured to:

receive, from the server via the transceiver, an indication of an additional product, and additional information associated with an availability of the additional product within the retail store, and cause the user interface to dynamically update to reflect the additional product and at least a portion of the additional information associated with the availability of the additional product within the retail store.

13. The electronic device of claim 8, wherein the processor is further configured to:

detect, via the user interface, a selection by the user of the at least one product, and in response to detecting the selection, cause the user interface to display an additional portion of the information associated with the availability of the at least one product within the retail store.

14. The electronic device of claim 8, wherein the information associated with the availability of the at least one product within the retail store indicates that the at least one product is not available within the retail store; and wherein the processor is further configured to:

determine, based at least in part on a location of the electronic device, an alternative retail store that has the at least one product available, and cause the user interface to indicate the alternative retail store.

* * * * *